Feb. 7, 1956  N. C. RENDLEMAN  2,733,500
METHOD OF MAKING A PLOWSHARE BLANK
Original Filed Oct. 17, 1945  2 Sheets-Sheet 1
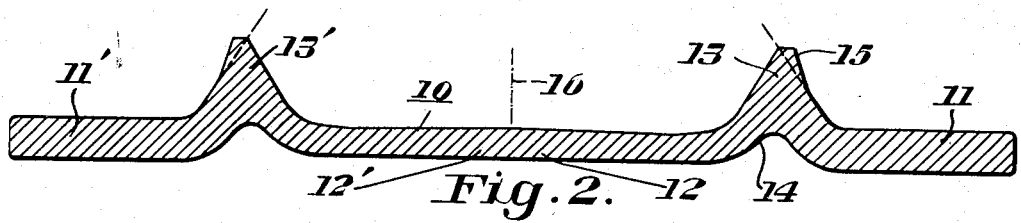
Fig.1.
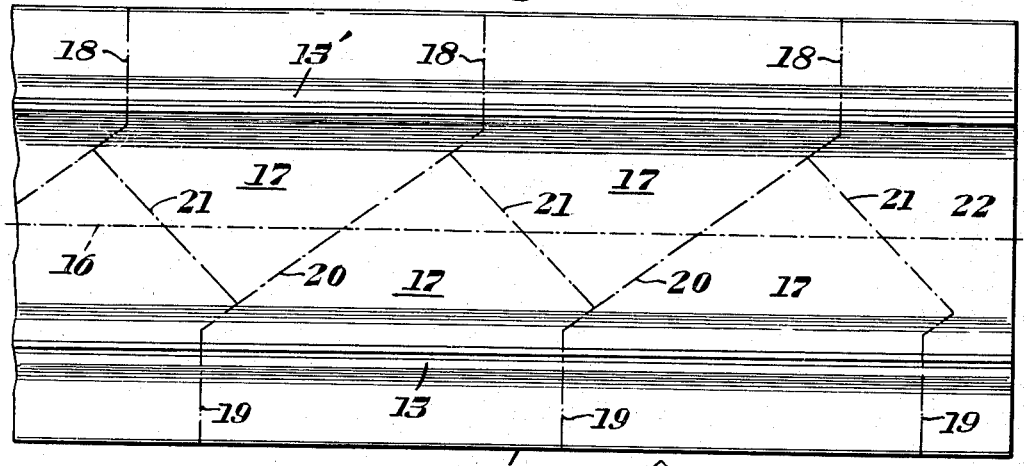
Fig.2.
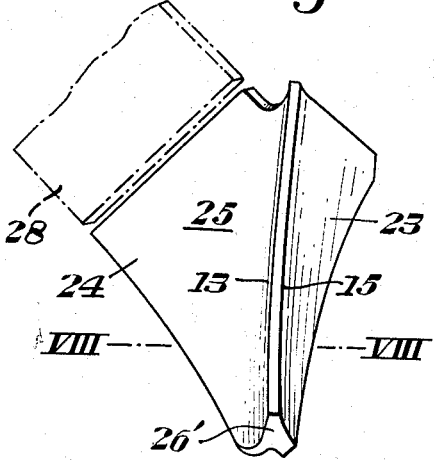
Fig.7.
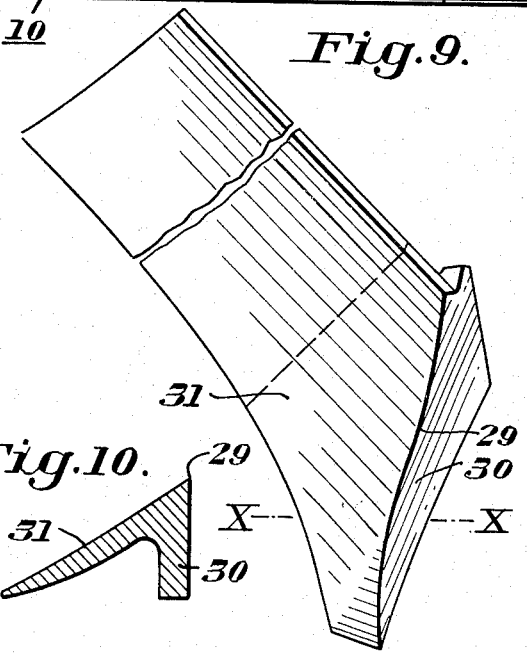
Fig.9.
Fig.8.
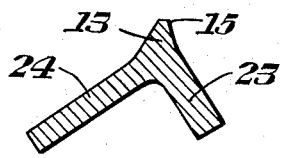
INVENTOR
Norman C. Rendleman
BY
Hoope Leonard & Glenn
ATTORNEYS Feb. 7, 1956   N. C. RENDLEMAN   2,733,500
METHOD OF MAKING A PLOWSHARE BLANK
Original Filed Oct. 17, 1945   2 Sheets-Sheet 2

INVENTOR
Norman C. Rendleman
BY
Hoopes Leonard & Glenn
ATTORNEYS

United States Patent Office 2,733,500
Patented Feb. 7, 1956

2,733,500

METHOD OF MAKING A PLOWSHARE BLANK

Norman C. Rendleman, Pittsburgh, Pa., assignor to Jones & Laughlin Steel Corporation, Pittsburgh, Pa., a corporation of Pennsylvania Original application October 17, 1945, Serial No. 622,777. Divided and this application April 18, 1950, Serial No. 156,621

7 Claims. (Cl. 29—14)

This invention relates to a method of making blanks adapted to be forged into plowshares and this application is a division of my copending and subsequently abandoned application Serial No. 622,777, filed October 17, 1945.

For a period of many decades up until quite recently, the accepted method of making plowshares, despite several serious objections thereto, has been to weld a forging forming the landside to a piece of plate forming the blade. The objections to this method are the difficulty and the cost of the welding operation, and the tendency of a share so made to fail at the weld. More recently, it has been proposed to make plowshares by providing an integral forging including the landside and a portion of the blade adjacent thereto, and butt welding to the blade portion of the forging a piece of substantially flat plate adapted to constitute the remainder of the blade. This method has proved quite desirable except for the difficulty in providing the forging including as an integral piece the landside and a portion of the blade. Attempts have been made to produce this part by rolling a bar of special shape, cutting portions therefrom and working them into a finished shape, specifically by forging the cut portion of the bar. The difficulty experienced in this operation has been that the forming of the blank leaves concavities in the blade portion resulting from the displacement of the metal by internal stresses set up in the bending operation. This is highly objectionable.

I have invented a novel plowshare blank and method of making it, whereby the aforementioned objections to the previous practice are overcome and further advantages obtained. In a preferred practice of my invention, I provide a rolled bar having a flanged web providing integral landside and blade portions, respectively, with a longitudinal rib at the junction therebetween. The web or blade portion of the bar is thicker in the region remote from the rib than in the immediate neighborhood of the rib. I cut from the bar pieces of proper shape to form forging blanks and roll the web portions individually to bring the landside into proper relation with the blade portion and to reduce the blade portion in the region where its thickness is greater, to substantially the thickness of the remainder of the blade portion thereby causing a progressing radial elongation in said region. The rolling and elongation of the web portion occur progressively as the piece is being bent to angular shape, thus providing the additional length necessary for the web portion in its new position. The internal stresses hitherto encountered in forming a rolled piece into a plowshare are thus prevented and the movement of metal in the dies is the minimum. The rolling operation produces a blank having integral landside and blade portions meeting in an edge of triangular section. The originally thicker part of the blade portion is reduced by the rolling to substantially the same thickness as the remainder of the blade portion and is somewhat lengthened thereby. The triangular edge and landside portion are bowed inwardly, i. e., convexly, toward the blade portion as a result of this lengthening. I also preferably shape the rib to provide a lip of excess material on the landside which, when removed by grinding, leaves the finished share with a sharp edge. A blank made according to my invention may easily be forged into finished shape after a piece of plate adapted to form the remainder of the blade has been butt welded to the blade portion of the blank. The blank conforms to the dies and the share is formed without internal stresses or undue movement of metal.

For a complete understanding of the invention, reference is made to the accompanying drawings illustrating a preferred practice and the blank produced thereby. In the drawings, Figure 1 is a cross section through a rolled bar adapted to be cut into pieces for the production of plowshare blanks;

Figure 2 is a plan view of the bar showing the manner of cutting it to form a number of starting pieces;

Figure 7 is a perspective view of the rolled blank;

Figure 8 is a cross section therethrough substantially along the plane of line VIII—VIII of Figure 7;

Figure 9 is a perspective view of the finished plowshare; and

Figure 10 is a cross section therethrough taken substantially along the plane of line X—X of Figure 9.

Figure 3:
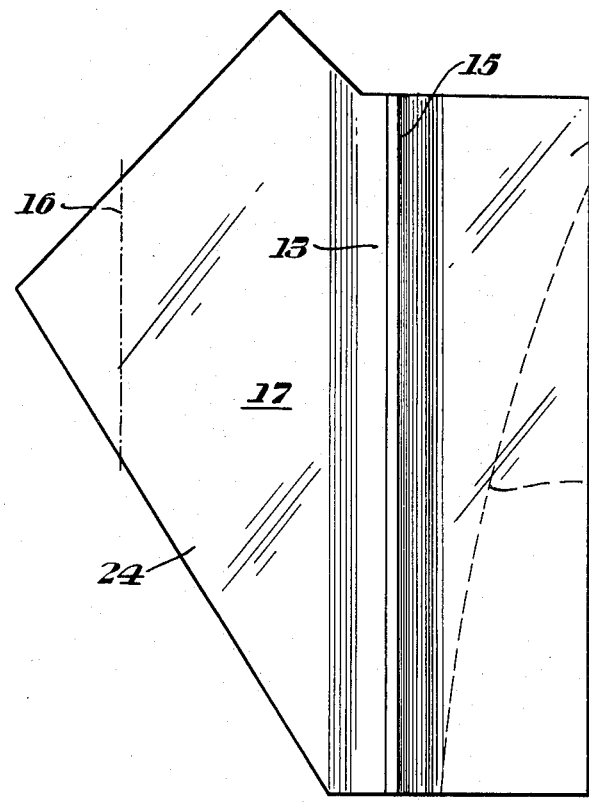
Figure 3 is a plan view of one of the pieces as cut from the rolled bar.

Referring now in detail to the drawings, I provide a rolled bar 10 including a flange or landside portion 11 and a web or blade portion 12, preferably disposed as substantially coplanar strips. An upstanding longitudinal rib 13 is integral with the landside and blade portions. A roundbottomed groove or channel 14 is formed in the surface of the bar opposite the rib 13. The rib 13 is of substantially triangular section but has a lip 15 along the vertex on the side adjacent the landside portion 11, for a purpose which will subsequently appear. For economy of manufacture, the bar 10 is symmetrical about a central longitudinal plane 16, having a duplicate landside portion 11', blade portion 12' and rib 13' on the opposite side of the central plane.

The blade portions 12 and 12' of the bar 10 (see Figure 1) are not uniform in thickness but are thicker at the central longitudinal plane 16 than in the neighborhood of the ribs 13 and 13'. The difference in thickness amounts to about 5%. In a particular case, the thickness at the central plane is .336" while the thickness adjacent the ribs is .320". The bar 10 may easily be rolled from a suitable billet by following well known rolling practices as to the shape and number of roll passes required. The billet, of course, should be of a composition suited for the manufacture of plowshares. For example, it may be of low-carbon steel if the finished shares are to be treated as by carburizing or the like. On the other hand, high-carbon steel may be used without any subsequent recarburizing.

Figure 2 illustrates the manner of cutting the bar 10 to form starting pieces 17 for making forging blanks. As clearly shown in the drawings, the bar is cut along transverse parallel lines 18 and 19 extending through the ribs 13. The lines 18 and 19 are staggered and are connected by diagonal cuts on lines 20. Additional cuts on diagonal lines 21 extend between the lines 20. The pieces 17 may conveniently be cut from the bar 10 in pairs by shearing along the lines 18, 19 and 20 and then severed along the line 21. It will be apparent that this manner of cutting provides the maximum number of pieces 17 per unit length of bar, the only scrap loss involved being the piece 22 at each end of the bar.

Figure 4:
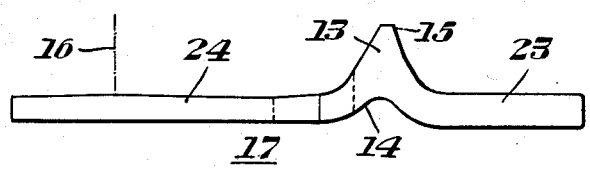
Figure 4 is an end view thereof.

Figures 3 and 4 show one of the pieces 17 as cut from the bar 10. It will be noted that the piece includes a landside portion 23 of rectangular shape and a blade portion 24 of roughly triangular shape between which the rib 13 extends. The blade portion 24, as previously stated, increases in thickness toward the central longitudinal plane 16.

The starting piece 17, after being cut from the bar 10, is subjected to hot-working to elongate the blade portion 24 adjacent the plane 16 and reduce its thickness substantially to the thickness of the blade portion adjacent the rib. At the same time, the landside portion 23 is bent down to a position generally at right angles to the blade portion. This is done by feeding the piece longitudinally, i. e., in a path parallel to the rib 13, between plain grooved rolls defining a pass of the proper shape. This pass may easily be laid out in accordance with known principles.

Figure 5:
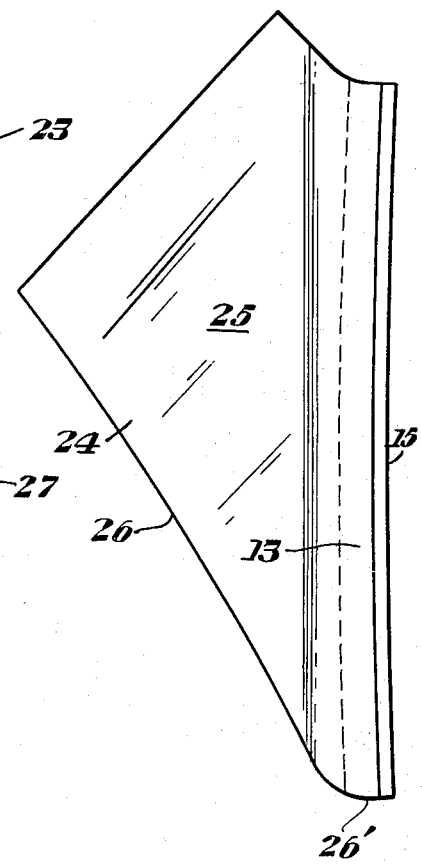
Figure 5 is a plan view of the blank after it has been rolled.
Figure 6:
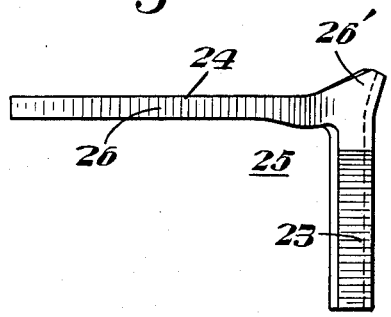
Figure 6 is an end view thereof.

Figures 5 and 6 illustrate the blank, indicated at 25, which results from rolling the starting piece as just described. It will be apparent that the thickness of the blade portion 24 has been made uniform throughout. This involves a slight displacement of the metal in the area of greatest thickness, and a consequent elongation of that part of the blade portion. As previously explained, this introduces a slight curvature into the longer diagonal edge 26 of the blade portion. The bending down of the landside portion 23 leaves it connected to the blade portion 24 by an edge 26' of generally triangular section (i. e., the rib 13) and the edge and the landside portion 23 are bowed inwardly intermediate their ends. As indicated by comparison of Figure 4 with Figures 6 and 7, the landside and blade portions 23 and 24 are each bent away from the top of the rib 13 in an arc of not more than about 45° to bring them into right angle relation, the bend being along the initially bowed juncture of the respective portions 23 and 24 with the rib 13. The blank 25 is now in condition for final forging after the landside portion 23 is cut along the line 27 (Figure 3) to give it the desired taper in the forward direction, and any other incidental trimming which may be necessary to smooth the edges.

Figures 7 and 8 illustrate the blank 25 when finally ready for forging. Before starting and forging operation, a piece of plate 28 of suitable size and shape is butt welded to the blade portion 24. When the weld has been completed and dressed, the blank is forged between suitable dies to bring it to the desired final shape. As previously indicated, the blank readily conforms to the dies and the share is formed without internal stresses or undue movement of metal. Care is taken during the forging operation to leave the lip 15 undisturbed. When the forging is finished, this lip furnishes a slight excess of metal which, when ground off, leaves a sharp cutting edge 29 at the intersection of the finished landside 30 and blade 31. The leading lower edge of the blade is also ground to the desired contour as shown in Figure 10.

It will be apparent from the foregoing description that the invention provides a plowshare forging blank and method of making it having numerous advantages. In the first place, the bar 10 from which the starting pieces are cut may easily be rolled by standard practice. In the second place, the increased length of the blade portion of the blank resulting from the reduction of the originally thicker part thereof prevents the development of internal stresses. The lip 15 of excess metal permits the share to be finished with a very sharp edge by a minimum amount of grinding. Since the only welding operation necessary to complete the share is a simple butt weld, the forging blank may be made of high-carbon steel as well as low-carbon steel, and the necessity for subsequent recarburizing thus avoided.

The invention permits a substantial reduction in the cost of the forging blank as compared to blanks having integral landside and blade portions as made heretofore. An even greater advantage in cost, number of operations and quality of product is achieved in contrast to the time-honored method of welding a landside forging to a complete blade.

Although I have illustrated and described a present preferred practice of forming a plowshare blank in accordance with the invention, it will be understood that changes in the details of the blank or the manufacturing operations may be made without departing from the spirit of the invention or the scope of the appended claims.

1. In a method of making a plowshare blank, the steps including rolling a bar having a landside portion, a blade portion and a longitudinal rib therebetween, said blade portion being thicker in a region spaced from said rib than in the immediate neighborhood of the rib, cutting a blank from said bar including landside and blade portions, and working the blank in a path generally parallel to the rib to elongate the blade portion, reduce its thickness in said region substantially to that of the blade portion adjacent the rib and cause a convex bowing of the rib toward the worked portion.

2. In a method of making a plowshare blank, the steps including rolling a bar having a landside portion, a blade portion in substantially the same plane, and a longitudinal rib therebetween, said blade portion being thicker in a region spaced from said rib than in the immediate neighborhood of the rib, cutting a blank from said bar including landside and blade portions, bringing the landside portion to substantially right-angled relation to the blade portion and elongating the blade portion by reducing its thickness in a path generally parallel to the rib in said region substantially to that of the blade portion adjacent the rib and causing a convex bowing of the rib toward the worked portion.

3. The method defined by claim 2 characterized by said bending, elongation and reduction being effected progressively by rolling.

4. A method of producing a plowshare blank, comprising the steps of rolling a bar having a pair of parallel strips of unequal thickness with an integral rib therebetween, the underside of the rib being channeled and the thinner strip being of increased thickness away from the rib, cutting a blank from the bar comprising a portion of the rib and a portion of each strip on either side thereof, said portion of the thinner strip being of generally triangular outline in plan view, bending the blank thus cut out about the rib portion of the blank with the bending crease extending along the channel underside of the rib and with the rib extending outwardly to form a plow edge, and working the projecting end of said portion of the thinner strip in a path generally parallel to the rib to reduce its thickness to the thickness of said strip near the rib, thereby elongating said portion of the thinner strip to serve as the base for a welded extension to form a plow blade and causing a convex bowing of the rib toward the elongated portion.

5. The method of rolling a plowshare blank, comprising the steps of rolling a bar having a pair of parallel strips of unequal thickness with an integral rib therebetween, said strips lying generally in the same plane and each being bowed out of the plane before merging into the rib, said rib being of generally triangular cross section with two corners of the triangle merging into the adjacent bowed portions of the strips and the underside of the rib opposite to the third corner of the triangle having a rounded groove smoothly merging into the adjacent bowed surfaces of the strips, cutting a blank from the bar comprising a portion of the rib and integral portions of each strip on either side thereof, and bending the blank along the length of the rib to bring the respective strip portions of the rib into approximately right angle relation, each strip being bent into such relation along its originally bowed portion adjacent the rib and through an arc not exceeding about forty-five degrees, whereby displacement and strain of metal where the blank is bent is minimized.

6. The method of rolling a plowshare blank, comprising the steps of rolling a bar having a pair of parallel strips of unequal thickness with an integral rib therebetween, the thinner of said strips being of increasing thickness away from the rib, said strips lying generally in the same plane and each being bowed out of the plane before merging into the rib, said rib being of generally triangular cross section with two corners of the triangle merging into the adjacent bowed portions of the strips and the underside of the rib opposite to the third corner of the triangle having a rounded groove smoothly merging into the adjacent bowed surfaces of the strips, cutting a blank from the bar comprising a portion of the rib and integral portions of each strip on either side thereof, the thinner strip portion being cut to form part of a plow blade and having a relatively long edge to form part of the leading edge of the plowshare blade, and rolling the blank while hot in a path generally parallel to the rib to reduce the thinner strip portion to a uniform thickness and to displace metal in the region of increasing thickness of said thinner strip portion, said displacement of metal causing a progressive radial elongation in said region which elongates said thinner strip portion and causes a concave bowing of its said long edge, and which also causes a bowing of the rib and adjacent part of said thicker strip portion convexly toward the thinner strip portion.

7. The method of rolling a plowshare blank, comprising the steps of rolling a bar having a pair of parallel strips of unequal thickness with an integral rib therebetween, the thinner of said strips being of increasing thickness away from the rib, said strips lying generally in the same plane and each being bowed out of the plane before merging into the rib, said rib being of generally triangularly cross section with two corners of the triangle merging into the adjacent bowed portions of the strips and the underside of the rib opposite to the third corner of the triangle having a rounded groove smoothly merging into the adjacent bowed surfaces of the strips, cutting a blank from the bar comprising a portion of the rib and integral portions of each strip on either side thereof, the thinner strip portion being cut to form part of a plow blade and having a relatively long edge to form part of the leading edge of the plowshare blade, rolling the blank while hot in a path parallel to the rib to reduce the thinner strip portion to a uniform thickness and thereby displacing metal in the thicker portion thereof to elongate said thinner strip portion and bow inwardly its said long edges and also to bow the rib and adjacent part of said thicker strip portion convexly toward the thinner strip portion, and during such rolling also bending the blank along the length of the rib to bring the respective strip portions of the rib into approximately right angle relation, each strip being bent into such relation along its originally bowed portion adjacent the rib and through an arc not exceeding about forty-five degrees, whereby displacement and strain of metal where the blank is bent is minimized.

References Cited in the file of this patent

UNITED STATES PATENTS

| | | |
|---|---|---|
| 93,162 | Barnes | Aug. 3, 1869 |
| 106,838 | Lane | Aug. 30, 1870 |
| 2,016,089 | Hasson | Oct. 1, 1935 |